US009288689B2

(12) United States Patent
Lee et al.

(10) Patent No.: US 9,288,689 B2
(45) Date of Patent: Mar. 15, 2016

(54) CONFIGURATION OF WIRELESS NETWORK CLOUD SYSTEM BASED ON DENSITY ESTIMATION

(75) Inventors: Kang-Won Lee, Nanuet, NY (US); Murtaza Zafer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 13/449,911

(22) Filed: Apr. 18, 2012

(65) Prior Publication Data
US 2013/0281049 A1 Oct. 24, 2013

(51) Int. Cl.
*H04M 11/00* (2006.01)
*H04W 24/00* (2009.01)
*H04W 24/02* (2009.01)
*H04W 16/18* (2009.01)

(52) U.S. Cl.
CPC ............. *H04W 24/00* (2013.01); *H04W 24/02* (2013.01); *H04W 16/18* (2013.01)

(58) Field of Classification Search
CPC ................................ H04W 4/26; H04W 24/08
USPC ........................................................ 455/405
See application file for complete search history.

(56) References Cited

U.S. PATENT DOCUMENTS

| 2002/0101834 | A1 | 8/2002 | Stanley | |
| 2004/0111382 | A1* | 6/2004 | Haji-Ioannou | 705/400 |
| 2005/0073980 | A1 | 4/2005 | Thomson et al. | |
| 2007/0002759 | A1 | 1/2007 | Diaz et al. | |
| 2007/0140182 | A1 | 6/2007 | Liu et al. | |
| 2009/0296635 | A1 | 12/2009 | Hui et al. | |
| 2009/0323530 | A1 | 12/2009 | Trigui et al. | |
| 2010/0202387 | A1 | 8/2010 | Sawai et al. | |
| 2010/0246544 | A1 | 9/2010 | Brisebois et al. | |
| 2010/0290413 | A1 | 11/2010 | Kuwahara | |
| 2013/0095846 | A1* | 4/2013 | Brisebois et al. | 455/456.1 |
| 2013/0243075 | A1* | 9/2013 | Dalela et al. | 375/240.01 |

FOREIGN PATENT DOCUMENTS

| CN | 1984116 A | 6/2007 |
| JP | 2009213093 A | 9/2009 |
| KR | 20110092950 A | 8/2011 |
| WO | 2009117812 A1 | 10/2009 |

OTHER PUBLICATIONS

S. Bhaumik et al., "Breathe to Stay Cool: Adjusting Cell Sizes to Reduce Energy Consumption," Green Networking, Aug. 2010, pp. 41-46, New Delhi, India.

(Continued)

*Primary Examiner* — Omoniyi Obayanju
(74) *Attorney, Agent, or Firm* — Jennifer R. Davis; Ryan, Mason & Lewis, LLP

(57) ABSTRACT

Techniques for configuring a wireless network cloud system comprise the following steps. A density metric is estimated corresponding to at least one given coverage area of a wireless network cloud system. A configuration is determined for one or more network-access components in the given coverage area of the wireless network cloud system in response to the estimated density metric. The determined configuration may then be applied to the one or more network-access components. The density metric may correspond to a user density and/or a traffic density in the given coverage area.

25 Claims, 6 Drawing Sheets

(56) References Cited

OTHER PUBLICATIONS

Dan Cosley, "Referee: An Open Framework for Practical Testing of Recommender Systems Using ResearchIndex," Proceedings of the 28th Very Large Databases (VLDB) Conference, Aug. 2001, pp. 35-46, Hong Kong, China.

Y. Lin et al., "Wireless Network Cloud: Architecture and System Requirements," IBM Journal of Research & Development, Jan./Feb. 2010, Paper 4, pp. 1-12, vol. 54, No. 1.

Y. Lin et al., "Wireless Network Cloud: Architecture and System Requirements," IBM Journal of Research and Development, Paper 4, Jan./Feb. 2010, pp. 38-49, vol. 54, No. 1.

\* cited by examiner

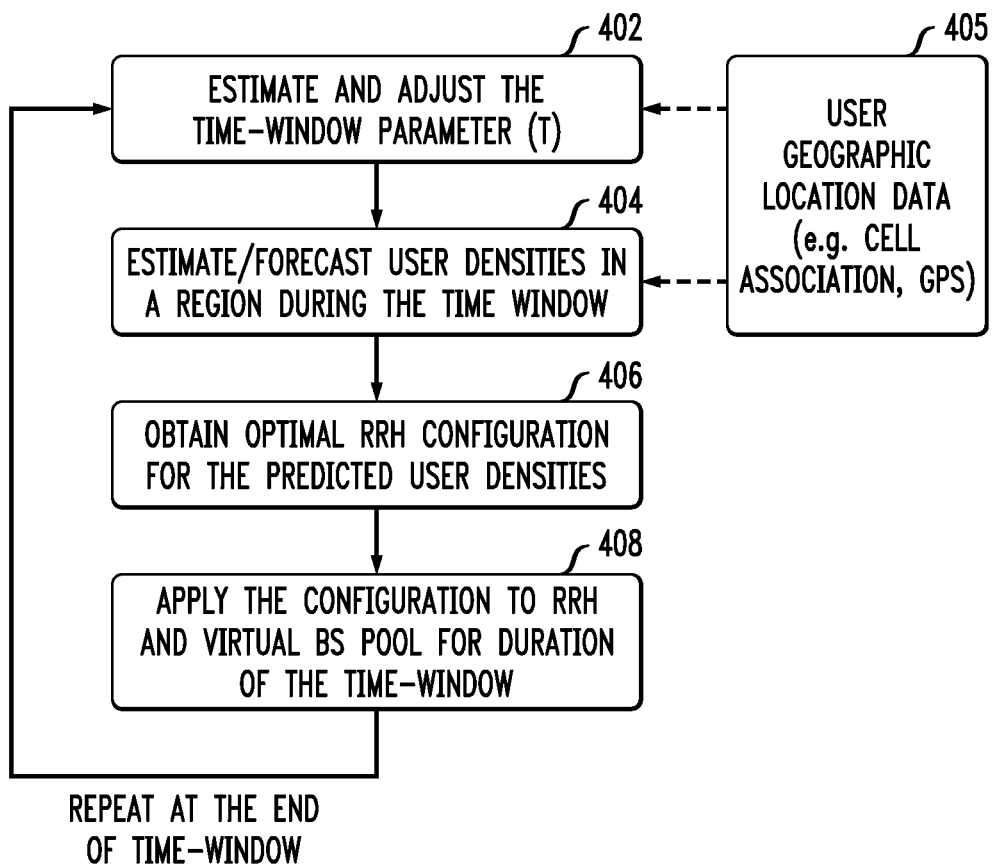

500

520

600

CONFIGURATION OF WIRELESS NETWORK CLOUD SYSTEM BASED ON DENSITY ESTIMATION

FIELD

The field of the invention relates to communications systems and, more particularly, to techniques for configuring a wireless network cloud system.

BACKGROUND

The wireless network cloud (WNC) is a new paradigm for building the next generation of mobile/cellular communications networks by utilizing cost efficient processing in a cloud architecture with software defined radios.

Traditional cellular networks consist of fixed base stations that employ custom-built hardware and software to process wireless signals, which then connect back to the Internet/PSTN (public switched telephone network). With the exponential growth in demand for wireless services, a main drawback with the traditional design is the significant capital investment in scaling the network and in installing, maintaining and upgrading base stations and other custom-built wireless equipment as the wireless standards evolve over time.

Alternatively, in a wireless network cloud architecture, the base stations are replaced with much less expensive remote radio heads (RRHs) which convert wireless waveforms into digital signals, which are then processed in a back-end cloud infrastructure. By exploiting the highly cost efficient processing in a cloud (e.g., dynamic resource provisioning, virtualization, statistical multiplexing, commodity hardware, and collaborative signal processing), a wireless network cloud architecture provides a cost effective way to build scalable next generation cellular networks.

SUMMARY

Embodiments of the invention provide techniques for configuring a wireless network cloud system.

For example, in one embodiment, a method comprises the following steps. A density metric is estimated corresponding to at least one given coverage area of a wireless network cloud system. A configuration is determined for one or more network-access components in the given coverage area of the wireless network cloud system in response to the estimated density metric. The determined configuration may then be applied to the one or more network-access components.

Further embodiments of the invention comprise one or more of the following features.

The given coverage area of the wireless network cloud system for which the density metric is estimated may comprise at least one geographic region associated with the wireless network cloud system.

The density metric estimating step may further comprise estimating the density metric over a given time period. The given time period may be adjusted in response to a given rate of change of a user density and/or a traffic density corresponding to the given coverage area.

The density metric estimating step may further comprise estimating a user density based on real-time geographic user location data. The real-time geographic user location data may be obtained from associations of mobile devices to corresponding network access points, or through global positioning system data.

The density metric estimating step may further comprise estimating the density metric using a forecasting methodology.

The one or more network-access components may comprise one or more remote radio head (RRH) components and/or components associated with a virtual base station pool.

The configuration determining step may further comprise determining the configuration for one or more network-access components by iteratively executing a wireless planning tool.

The density metric may correspond to a user density, a traffic density, and/or an active device density corresponding to a given coverage area of the wireless network cloud system.

Advantageously, one or more embodiments of the invention allow for the dynamic control of network-access components, such as RRHs, in a wireless network cloud system so as to maintain optimal service levels associated with, by way of example only, network data rates, network connectivity and network coverage area.

These and other embodiments of the invention will become apparent from the following detailed description of illustrative embodiments thereof, which is to be read in connection with the accompanying drawings.

BRIEF DESCRIPTION OF THE DRAWINGS

FIG. 4 illustrates a methodology for configuring a wireless network cloud system based on user/traffic density, according to an embodiment of the invention.

DETAILED DESCRIPTION

Figure 1:
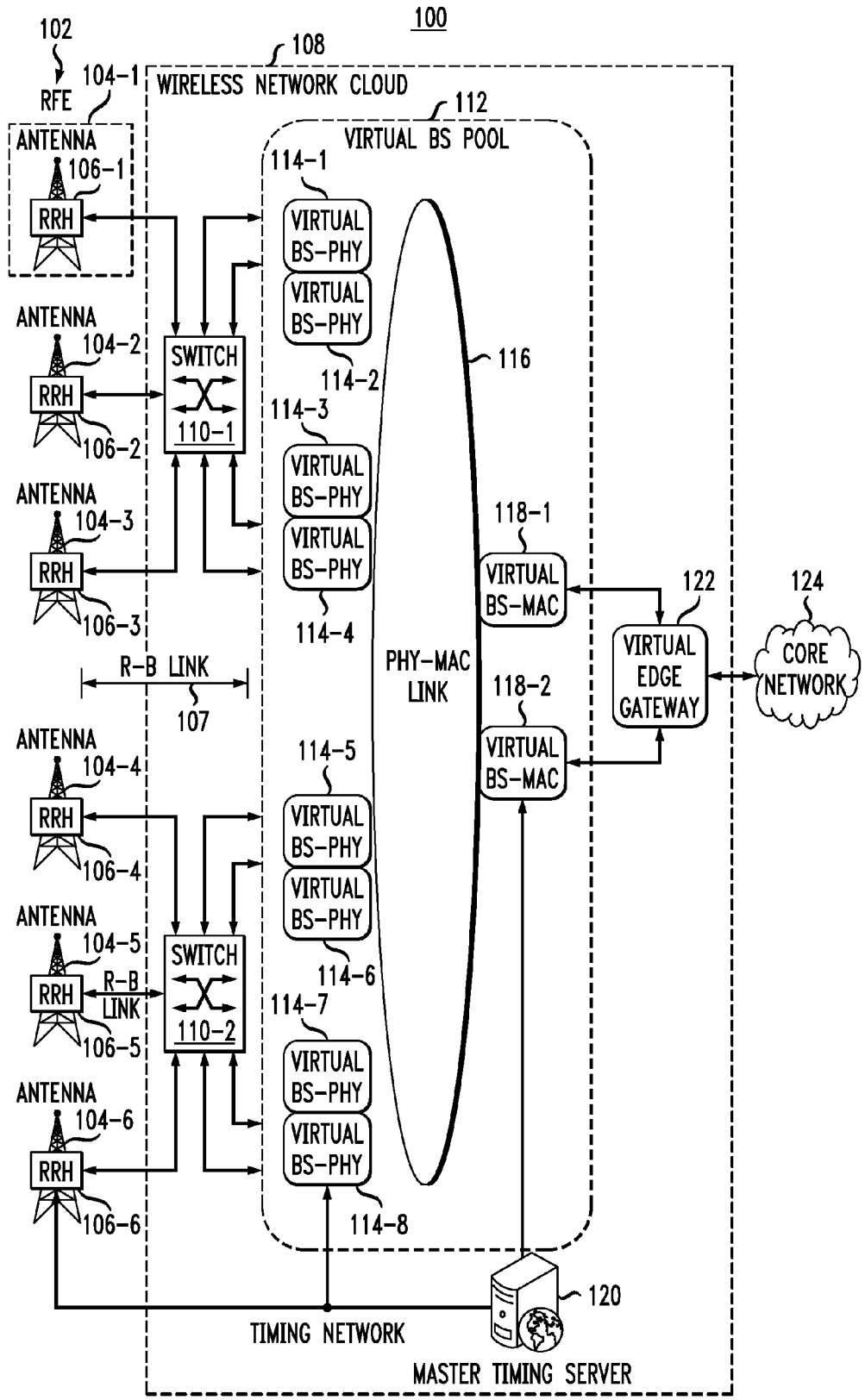
FIG. 1 illustrates a wireless network cloud system, according to an embodiment of the invention.

Illustrative embodiments of the invention may be described herein in the context of an illustrative architecture of a wireless network cloud system. However, it is to be understood that embodiments of the invention are not limited to the illustrative architecture shown but are more broadly applicable to other suitable wireless communications systems.

As used herein, the phrase "wireless network cloud system" refers to a system comprising a wireless network that employs cloud processing techniques.

As used herein, the term "cloud" refers to a collective computing infrastructure that implements a cloud computing (processing) paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

It is realized that one of the main problems in a wireless network cloud architecture is the control of remote radio heads (RRHs). RRH control is essential for maintaining high service levels such as high data rates, connectivity and large coverage. Embodiments of the invention provide techniques for control of RRHs (e.g., powering RRHs on/off, controlling transmit powers, bandwidth/frequency, etc.) based on dynamic estimation and prediction of a density metric.

As used herein, the phrase "density metric" refers to a measure of a given attribute over a given spatial unit and/or over a given temporal unit. By way of example only, the attribute can be the number of users, the amount of data traffic, or the number of active communication devices. A given spatial unit can be, e.g., a square mile, while a given temporal unit can be, e.g., an hour. Thus, in this example, and for a particular geographic coverage area of a wireless network cloud system, the density metric can measure the number of users per square mile. This can also be qualified by a temporal constraint, i.e., the number of users per square mile over one hour time period. Examples of other spatial units include, but are not limited to, square feet, square meters, square kilometers, and the like. Examples of other temporal units include, but are not limited to, seconds, minutes, days, weeks, months, years, and the like. By way of further example, when the density metric corresponds to the amount of traffic in a given area, the metric could relate to specific types of traffic, e.g., video traffic density, web-data traffic density, etc.

In one or more illustrative embodiments, the density metric may be collected per wireless network protocols such as, but not limited to, GSM (Global System for Mobile Communications), GPRS (General Packet Radio Service), CDMA (Code Division Multiple Access), LTE (Long Term Evolution), WiMAX (Worldwide Interoperability for Microwave Access), etc.

Thus, in one illustrative embodiment, a user density metric is, for example, based on determining geographical user density in real-time utilizing location data such as, but not limited to, current cell association, global positioning system (GPS) data, etc.

For example, it is realized that, in a city, user densities change significantly over time as people move between residential, commercial and entertainment areas during the course of the day. Embodiments of the invention modify the network topology based on real-time calculation and prediction of these densities to optimally adapt the network to user patterns.

Existing solutions to the problem of controlling base stations in traditional cellular networks include either a fixed topology solution where the parameters are fixed in advance based on prior history, dynamic control of the parameters based on objectives such as periodic traffic distribution, energy consumption, etc. over longer time scales (on the order or weeks or months). Existing solutions for traditional networks cannot be applied to the wireless network cloud system as they do not take into account the highly dynamic user density and control of network topology in real-time based on density-metric estimates.

Accordingly, in this illustrative embodiment, a methodology is provided for controlling the topology of RRHs (e.g., density of active RRHs in a region, their transmit power levels, etc.) and controlling the allocation of compute resources for the virtual base-station pool in the cloud (e.g., virtual machines allocated for the virtual base-station pool of a geographic region, migration of compute resources based on changes in the density of active RRHs), by measuring and predicting a density metric in a geographical region (e.g., through cell phone associations, GPS data, user trajectory mining, etc.). In one example, the methodology estimates a current density metric in a region (and/or neighboring regions), predicts the density metric over a time window, and controls network topology/RRHs and compute resource allocation based on the estimated densities and temporal predictions.

Thus, the overall wireless network topology can be adapted in real-time to changing user patterns and provide better service levels while efficiently utilizing system resources. By controlling the RRHs based on a density metric, the load per RRH is balanced over time, network coverage and data rates are optimized, allocation of compute resources to virtual base-station pools is optimized, and the overall network cost is minimized. For example, in regions with a high density metric, more RRHs can be made active with smaller coverage areas per RRH to balance user load, interference and radio resources, and more compute resources can be allocated to the virtual base-station pool of this region, while in low density regions the number of active RRHs can be reduced to minimize system costs. Since in a wireless network cloud architecture RRHs and allocation of compute resources to base-station pools can be easily controlled from the cloud center, the above adaptation can be carried out in real-time.

FIG. 1 illustrates an example of a wireless network cloud system. In general, a typical wireless network cloud architecture includes a plurality of remote radio heads (or wireless antenna) that connect to a network cloud/data center for processing wireless signals. Since RRHs are orders of magnitude cheaper than traditional base stations and do not require extensive maintenance, they can be deployed in large numbers. Typically several hundreds of thousands of RRHs could connect to a single network cloud center. A description of a wireless network cloud system can be found, for example, in Y. Lin et al., "Wireless Network Cloud: Architecture and System Requirements," IBM Journal of R&D, January-February 2010, vol. 54, issue 1, the disclosure of which is incorporated by reference herein in its entirety.

More particularly, as shown in FIG. 1, a wireless network cloud (WNC) system 100 comprises a plurality of antenna 104-1 through 104-6, each having a remote radio head (RRH) associated therewith referenced as 104-1 through 104-6. It is to be understood that only six antenna and RRHs are shown for illustrative purposes, and thus the system may have fewer or more of each component. Note that a radio front end (RFE) comprises an antenna, an RRH and an antenna tower. It is also noted that in the figure, a wireless network cloud system that includes virtual BS with PHY layer capability is shown as an example. Alternative embodiments of the invention can be applied to a wireless network cloud system where PHY layer processing is done at RRH and the cloud processes MAC layer and up, or to a wireless network cloud where any combination of PHY, MAC, Network layer processing is incurred inside the cloud.

Further, as shown, the WNC system 100 comprises a wireless network cloud/data center 108, which communicates with the RFEs via switches 110-1, 110-2 and RFE-to-base station link (R-B link) 107. The wireless network cloud/data center 108 comprises a virtual base-station (BS) pool 112. The virtual BS pool 112 is implemented via software radio technology. Thus, software packages functioning as a virtual BS-PHY (base station physical layer) component and a virtual BS-MAC (base station media access control layer) component form one virtual BS.

As shown in FIG. 1, a plurality of virtual BS-PHY components 114-1 through 114-8 are in communication with a virtual BS-MAC component 118-1 and/or a virtual BS-MAC component 118-2 via a PHY-MAC link 116. More or less BS-PHY components and BS-MAC components can be implemented in the system. Thus, virtual BS pool components are dynamically allocated (e.g., one MAC component and one PHY component) to form a virtual BS.

Accordingly, with the WNC system, the function of the radio head is decoupled from the base station (BS) by using the RRHs. The BS system uses software radio technology thus allowing the BS equipment to be located in the data center, as explained above.

The timing and synchronization of the WNC system 100 is provided by the master timing server 120 (along with the timing network that couples the RRHs and the virtual BS pool components (BS-PHY and BS-MAC components). Further, as shown in FIG. 1, the virtual BS pool 112 is coupled to a core network 124 via a virtual edge gateway 122. Note that embodiments of the invention are not intended to be limited to any central timing/sync services.

Figure 2:
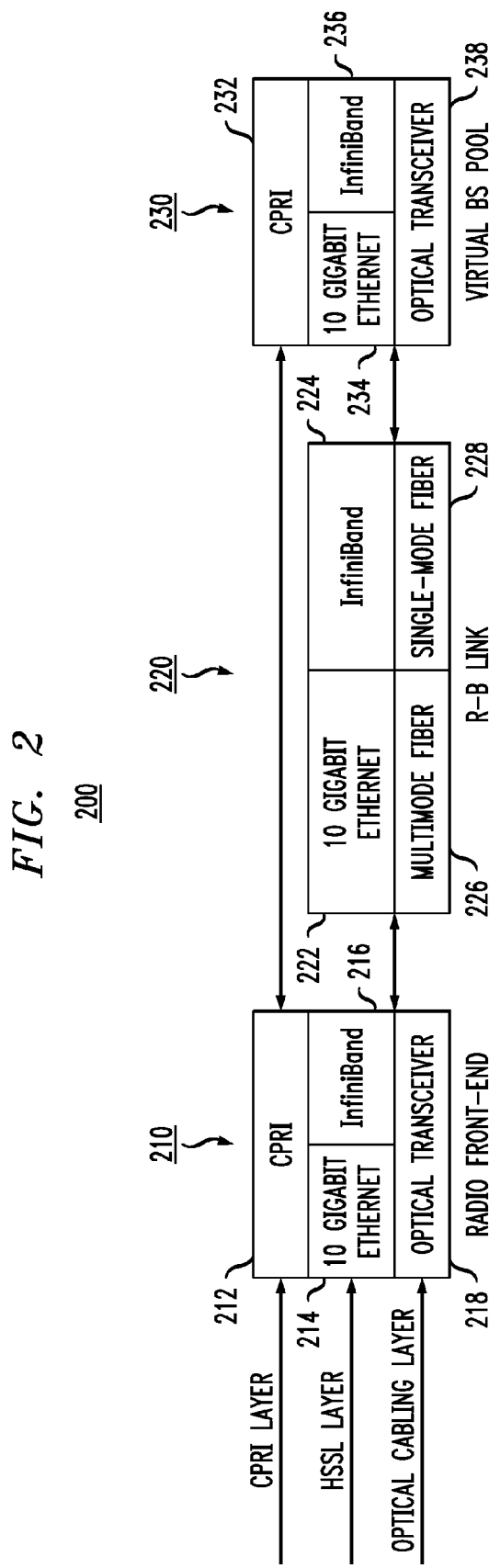
FIG. 2 illustrates a link layer structure for a link between the radio front end and the virtual base station pool of the wireless network cloud system in FIG. 1.

FIG. 2 illustrates a link layer structure for a link between the radio front end (RFE) 102 and the virtual base station pool 112 of the wireless network cloud system 100. More particularly, link layer structure 200 shown in FIG. 2 corresponds to the R-B link 107 shown in FIG. 1.

The link 220 between the RFE 210 and virtual BS pool 230 is represented as a three layer structure, i.e., a CPRI (common public radio interface) layer, an HSSL (high-speed serial link) layer and an optical cabling layer. The RFE and virtual BS pool have respective CPRI layer components (212 in the RFE and 232 in the virtual BS pool). The HSSL layer comprises 10 Gigabit Ethernet or InfiniBand switching components (214/216 in the RFE and 234/236 in the virtual BS pool). These functions are shown as 222/224 in link 220. Further, the RFE and virtual BS pool have respective optical cabling layer components (218 in the RFE and 238 in the virtual BS pool). These functions are shown as 226 (multimode fiber) and 228 (single-mode fiber) in link 220.

In accordance with illustrative embodiments of the invention, it has been realized that user and/or traffic densities in a geographic region fluctuate significantly over relatively short time scales (e.g., hours). This is due, at least in part, to the movement of people (and their activated mobile devices) between commercial, entertainment and residential areas during the course of a day. As such, illustrative embodiments of the invention provide techniques to control the allocation of wireless cloud resources in real-time through real-time measurements and forecasting of user/traffic density in a geographical region. Examples of such real-time control include, but are not limited to, turning on RRHs in an area where the number of users show an increasing trend, allocating more computing resources to the processes that perform signal processing, etc. Examples of such real-time measurements and forecasting include, but are not limited to, using sources such as cell phone association, GPS data, spatio-temporal user trajectory mining, density predictions, etc. Other well-known forecasting methodologies may be employed.

Advantages realized by one or more embodiments include, but are not limited to: (i) a more responsive and effective wireless network cloud that adapts at a fast scale to changing user patterns; (ii) pro-active management of network-access components (e.g., RRHs and virtual BS pool components) to meet changing geographical user patterns; (iii) pro-active and dynamic balancing of RRH load over time, network coverage optimization and network cost minimization; and (iv) energy saving at RRH and datacenter by turning off unnecessary compute/communication resources while meeting all the performance and availability requirements.

In one embodiment, a control module is provided (referred to as a remote radio head control module), which resides in the network cloud (e.g., 108 in FIG. 1) and provides control of the RRHs as will be explained in more detail below. It is to be appreciated that the RRH control module does not necessarily have to reside in the wireless network cloud, but rather can be located elsewhere in the overall communication system.

Figure 3:
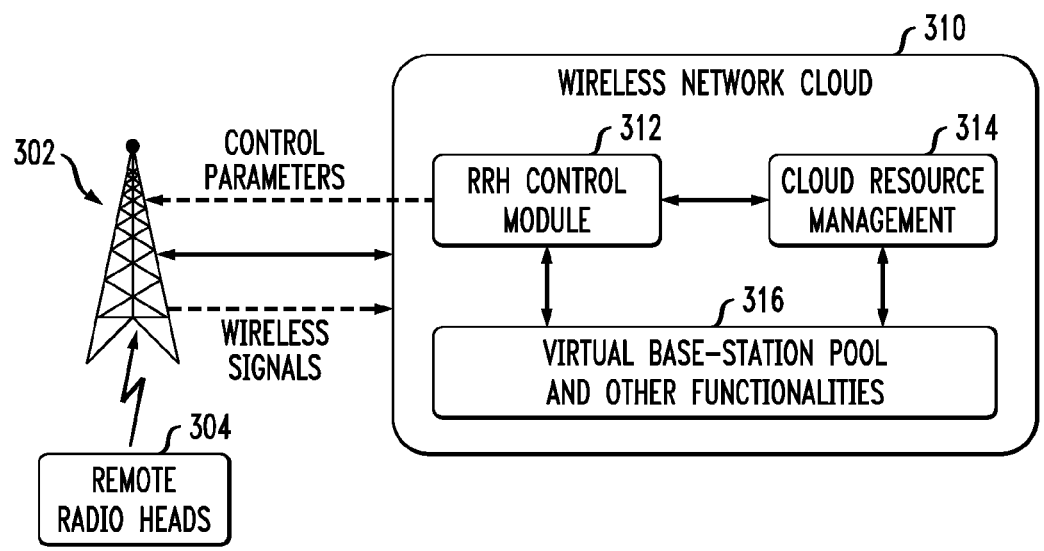
FIG. 3 illustrates a remote radio head control module implemented in a wireless network cloud system, according to an embodiment of the invention.

FIG. 3 illustrates a remote radio head control module implemented in a wireless network cloud system 300, according to an embodiment of the invention. More particularly, FIG. 3 shows an antenna 302 with an RRH 304 (corresponding to an antenna 104 and RRH 106 in FIG. 1) forming an RFE (corresponding to an RFE 102 in FIG. 1). The RFE is coupled to a wireless network cloud/data center 310 (corresponding to 108 in FIG. 1). In the wireless network cloud 310, as shown, is an RRH control module 312, a cloud resource management module 314 and a virtual BS pool (corresponding to 112 in FIG. 1) and other functionalities 316. Note that the cloud resource management module 314 can include timing control, switching control, gateway control and other functions.

The RRH control module 312 advantageously provides the real-time network-access component control described above via one or more control parameters. In particular, module 312 controls the RRHs as a function of dynamically changing user density (and/or traffic density) over short time-scales. In one embodiment, this is achieved using real-time user location data obtained from such information as cell associations or GPS, and through user trajectory predictions. The cloud resource management module 314 advantageously provides real-time control of compute-resource provisioning in the cloud, e.g. allocation of virtual machines to the virtual BS pool and determining the amount of resources to be assigned to VMs and specific protocol handling processes. A main goal is to enable a rapidly changing cellular network topology that adapts at a fast scale to changing geographical user patterns.

FIG. 4 illustrates a methodology 400 for configuring a wireless network cloud system based on a density metric, according to an embodiment of the invention. In particular, as shown, control of RRHs and compute-resources is achieved in a time-slotted manner where a particular control decision is applied for a certain time-window. We note that the size of the time window may adaptively change based on the dynamics observed in the density metric.

First, in step 402, the length of the time-window is estimated during which the control decision is applied. In this embodiment, estimation of the time-window is computed based on the rate of change of the density metric. That is, if the density metric in the various geographical cells is changing rapidly, a smaller time-window is estimated; while if the density metric is changing slowly, a larger time-window is estimated. This step takes as input the current and historical data (block 405) to estimate the rate of change of the density metric. For example, the user location data (e.g., derived from cell associations of users as well as through GPS values) and traffic volume data.

In step 404, the density metric is estimated and/or predicted for the duration of the time-window. Step 404 uses as input the current and historical data (block 405). For example, based on the user location data, current user density is estimated, then, an average user density is predicted for the duration of the time-window. Such a prediction can be done in various ways utilizing, for example, predictions on user path trajectories, rates of incoming and leaving users from a cell region, etc.

In step 406, given the estimated density metric over the geographic area of interest, an optimal RRH configuration and optimal compute-resource provisioning in the cloud is computed. This includes the optimal density of active RRHs, their transmit power levels, and other parameters, as well as the amount of compute resources (e.g. virtual machines) allocated for each base-station pool for PHY/MAC signal processing The optimization can take into account several objectives including load per RRH, average user density in a cell, network cost in maintaining active RRHs, compute-resource cost in maintaining the compute-resources of the virtual base-station pools, etc. The outcome of this step is the set of active RRHs and their configuration parameters, which determines the coverage area of individual RRHs and the underlying network topology (including, but not limited to, virtual BS pool components).

In step 408, the optimal configuration derived from step 406 is applied to the network, and is followed during the duration of the time-window. At the end of the window, the above steps are repeated.

Figure 5A:
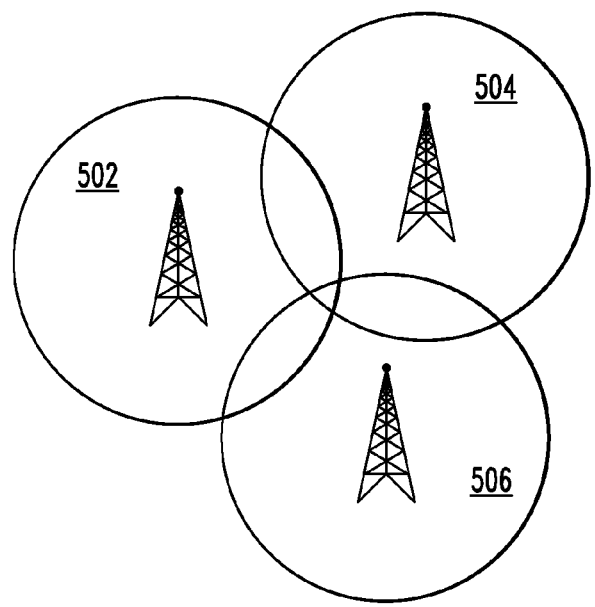
FIGS. 5A and 5B illustrate user density scenarios, according to embodiments of the invention.
Figure 5B:
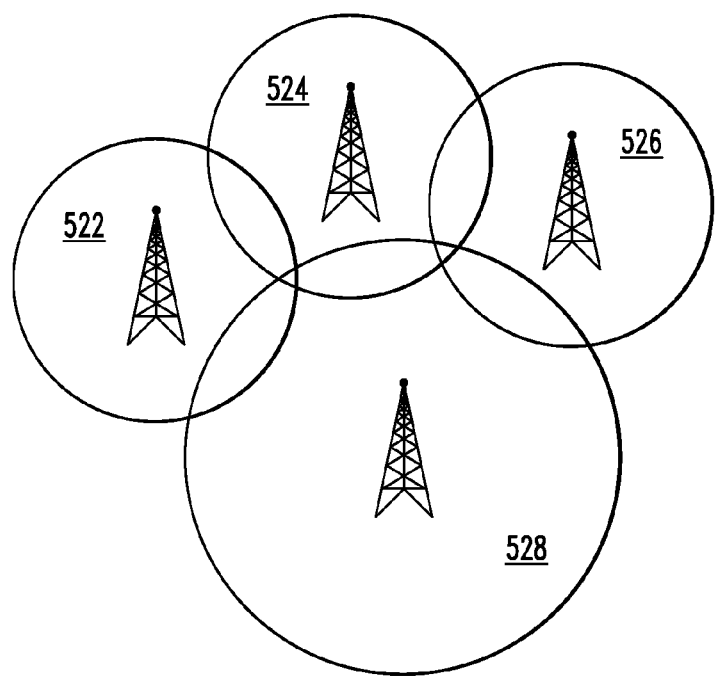

FIGS. 5A and 5B illustrate user density scenarios, according to embodiments of the invention. In particular, FIG. 5A illustrates a scenario 500 where user density is distributed equally among three cells 502, 504 and 506 (geographic regions or areas) of the wireless network cloud system. In such a scenario, it is assumed that the RRH control module generates control parameters to effectuate an equal distribution of active RRHs in each cell. However, in scenario 520 in FIG. 5B, the shaded cells 522, 524 and 526 are experiencing a heavy user density than cell 528, and it is therefore assumed that the RRH control module allocates more RRH/virtual BS pool components to those more active cells.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-5, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-5, can also include, as described herein, providing a system, wherein the system includes distinct modules (e.g., modules comprising software, hardware or software and hardware). By way of example only, the modules may include, but are not limited to, the various modules shown and described in the context of FIG. 1-3. These and other modules may be configured, for example, to perform the steps described and illustrated in the context of FIGS. 4 and 5.

Figure 6:
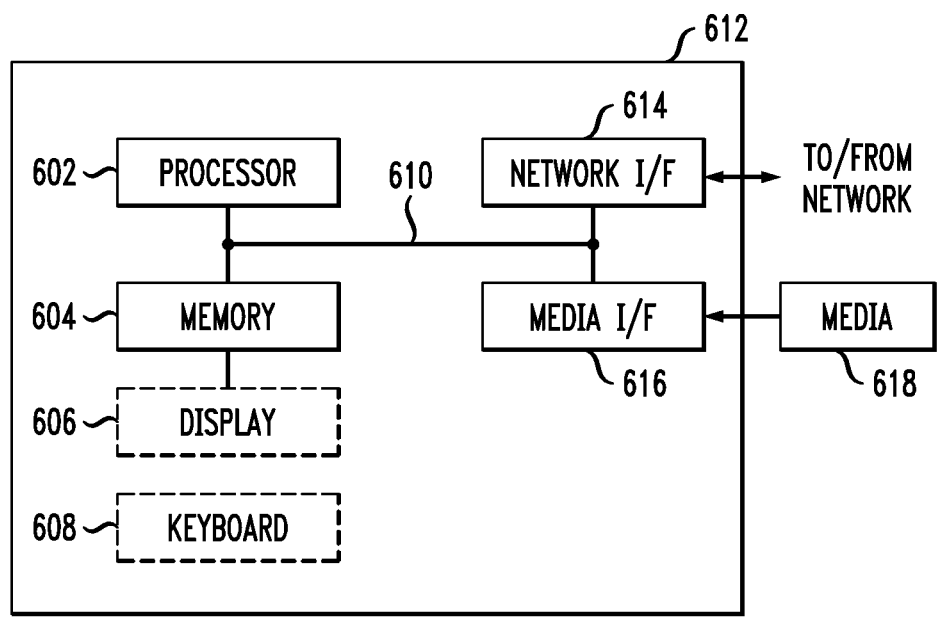
FIG. 6 illustrates a computing device in accordance with which one or more components/steps of techniques of the invention may be implemented, according to an embodiment of the invention.

One or more embodiments can make use of software running on a general purpose computer or workstation. With reference to FIG. 6, such an implementation 600 employs, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to optionally include, for example, one or more mechanisms for inputting data to the processing unit (for example, keyboard or mouse), and one or more mechanisms for providing results associated with the processing unit (for example, display or printer).

The processor 602, memory 604, and input/output interface such as display 606 and keyboard 608 can be interconnected, for example, via bus 610 as part of a data processing unit 612. Suitable interconnections, for example, via bus 610, can also be provided to a network interface 614, such as a network card, which can be provided to interface with a computer network, and to a media interface 616, such as a diskette or CD-ROM drive, which can be provided to interface with media 618.

A data processing system suitable for storing and/or executing program code can include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 608 for making data entries; display 606 for viewing data; pointing device for selecting data; and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 612 as shown in FIG. 6) running a server program. It will be understood that such a physical server may or may not include a display and keyboard. Further, it is to be understood that the components shown in FIGS. 1-3 may be implemented on one server or on more than one server.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   estimating a density metric over a given time period, the density metric corresponding to a density associated with at least one given coverage area of a wireless network cloud system;
   adjusting the given time period in response to a given rate of change of the density corresponding to the given coverage area, such that the given time period is decreased as the given rate of change increases and the given time period is increased as the given rate of change decreases, wherein the density metric is estimated more frequently than a current estimation frequency when the rate of change of the density corresponding to the given coverage area increases and the density metric is estimated less frequently than the current estimation frequency when the rate of change of the density corresponding to the given coverage area decreases; and
   determining a configuration for one or more network-access components in the given coverage area of the wireless network cloud system in response to the estimated density metric;
   wherein the estimating, adjusting, and determining steps are executed on at least one computing device.

2. The method of claim 1, further comprising applying the determined configuration to the one or more network-access components.

3. The method of claim 1, wherein the given coverage area of the wireless network cloud system for which the density metric is estimated comprises at least one geographic region associated with the wireless network cloud system.

4. The method of claim 1, wherein the density metric estimating step further comprises estimating a user density based on real-time geographic user location data.

5. The method of claim 4, wherein the real-time geographic user location data is obtained from associations of mobile devices to corresponding network access points.

6. The method of claim 4, wherein the real-time geographic user location data is obtained through global positioning system data.

7. The method of claim 1, wherein the density metric estimating step further comprises estimating the density metric using a forecasting methodology.

8. The method of claim 1, wherein the one or more network-access components comprise one or more remote radio head components.

9. The method of claim 1, wherein the one or more network-access components comprise components associated with a virtual base station pool.

10. The method of claim 1, wherein the configuration determining step further comprises determining the configuration for one or more network-access components by iteratively executing a wireless planning tool.

11. The method of claim 1, wherein the density metric corresponds to at least one of a user density, a traffic density, and an active device density.

12. An apparatus, comprising:
a memory; and
a processor device operatively coupled to the memory and configured to:
estimate a density metric over a given time period, the density metric corresponding to a density associated with at least one given coverage area of a wireless network cloud system;
adjust the given time period in response to a given rate of change of the density corresponding to the given coverage area, such that the given time period is decreased as the given rate of change increases and the given time period is increased as the given rate of change decreases, wherein the density metric is estimated more frequently than a current estimation frequency when the rate of change of the density corresponding to the given coverage area increases and the density metric is estimated less frequently than the current estimation frequency when the rate of change of the density corresponding to the given coverage area decreases; and
determine a configuration for one or more network-access components in the given coverage area of the wireless network cloud system in response to the estimated density metric.

13. The apparatus of claim 12, wherein the processor device is further configured to cause application of the determined configuration to the one or more network-access components.

14. The apparatus of claim 12, wherein the given coverage area of the wireless network cloud system for which the density metric is estimated comprises at least one geographic region associated with the wireless network cloud system.

15. The apparatus of claim 12, wherein the estimation of the density metric further comprises estimating a user density based on real-time geographic user location data.

16. The apparatus of claim 15, wherein the real-time geographic user location data is obtained from associations of mobile devices to corresponding network access points.

17. The apparatus of claim 15, wherein the real-time geographic user location data is obtained through global positioning system data.

18. The apparatus of claim 12, wherein the estimation of the density metric further comprises estimating the density metric using a forecasting methodology.

19. The apparatus of claim 12, wherein the one or more network-access components comprise one or more of: a remote radio head component; and a component associated with a virtual base station pool.

20. The apparatus of claim 12, wherein the density corresponds to at least one of a user density, a traffic density, and an active device density.

21. An article of manufacture comprising a non-transitory computer readable storage medium for storing computer readable program code which, when executed, causes a computer to:
estimate a density metric over a given time period, the density metric corresponding to a density associated with at least one given coverage area of a wireless network cloud system;
adjust the given time period in response to a given rate of change of the density corresponding to the given coverage area, such that the given time period is decreased as the given rate of change increases and the given time period is increased as the given rate of change decreases wherein the density metric is estimated more frequently than a current estimation frequency when the rate of change of the density corresponding to the given coverage area increases and the density metric is estimated less frequently than the current estimation frequency when the rate of change of the density corresponding to the given coverage area decreases; and
determine a configuration for one or more network-access components in the given coverage area of the wireless network cloud system in response to the estimated density metric.

22. The article of manufacture of claim 21, wherein estimation of the density metric further comprises at least one of: estimating a user density based on real-time geographic user location data; and estimating the density metric using a forecasting methodology.

23. The article of manufacture of claim 22, wherein the real-time geographic user location data is obtained from one of: associations of mobile devices to corresponding network access points; and global positioning system data.

24. The method of claim 1, further comprising applying the determined configuration to the wireless network cloud system for the given period of time by controlling allocation of the one or more network-access components.

25. The method of claim 24, wherein controlling allocation of the one or more network-access components comprises at least one of: allocating a set of active remote radio head components; allocating one or more virtual machines for one or more virtual base-station pools; and migrating compute resources based on changes in a density of active remote radio head components.

* * * * *